United States Patent [19]

Ban et al.

[11] 4,030,134

[45] June 14, 1977

[54] APPARATUS FOR TURNING ROTOR FOR EACH DESIRABLE ANGLE BY DRIVING FORCE OF CAPSTAN DRIVE SYSTEM

[75] Inventors: Itsuki Ban, Higashi-Oizumi; Takanori Kasuya, Kodaira; Kanji Yano, Higashi-Murayama; Kenichi Maruyama, Toyoshima, all of Japan

[73] Assignee: Itsuki Ban, Tokyo, Japan

[22] Filed: Nov. 25, 1975

[21] Appl. No.: 635,146

[30] Foreign Application Priority Data

Nov. 27, 1974 Japan ............................ 49-135524

[52] U.S. Cl. .................. 360/92; 242/199; 360/93; 360/137
[51] Int. Cl.² .................. G11B 21/08; G11B 15/08
[58] Field of Search ............ 360/106, 137, 109, 93, 360/94, 95, 96; 242/199

[56] References Cited

UNITED STATES PATENTS

| 3,663,022 | 5/1972 | Ban | 360/106 |
|---|---|---|---|
| 3,672,686 | 6/1972 | Ban | 360/106 |
| 3,781,018 | 12/1973 | Cayton, Jr. | 360/106 |
| 3,809,827 | 5/1974 | Oyaba | 360/106 |
| 3,816,851 | 6/1974 | White | 360/92 |
| 3,839,737 | 10/1974 | Vogel | 360/106 |
| 3,921,216 | 11/1975 | Wada | 360/92;106 |

OTHER PUBLICATIONS

B496,964, Apr. 1976, Andrews, 360/92.

Primary Examiner—Jay P. Lucas
Attorney, Agent, or Firm—Oblon, Fisher, Spivak, McClelland & Maier

[57] ABSTRACT

An apparatus is provided for turning a rotor for each desirable angle by a capstan drive system wherein an eccentric free travelling ring carried by a turnable lever at a point removed from the pivot end of the lever is thus contactable and discontactable with a rotary shaft of the capstan drive system. A small gear is connected to the free travelling ring and is engaged with another large rotor gear for reducing the rotation thereof, the large gear being pivotally mounted on the pivot bearing of the turntable lever. Means are provided for biasing the free travelling ring toward the rotary shaft of the capstan drive system and further control means are provided for interlocking the free end of the turntable lever so as to prevent contact of the free travelling ring with the rotary shaft of the capstan drive system.

4 Claims, 4 Drawing Figures

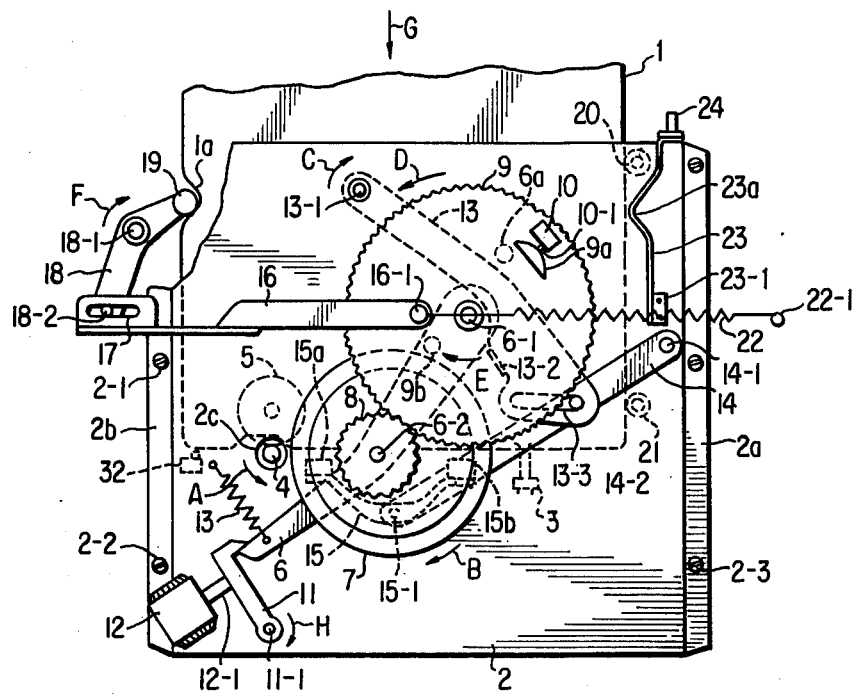
FIG.1
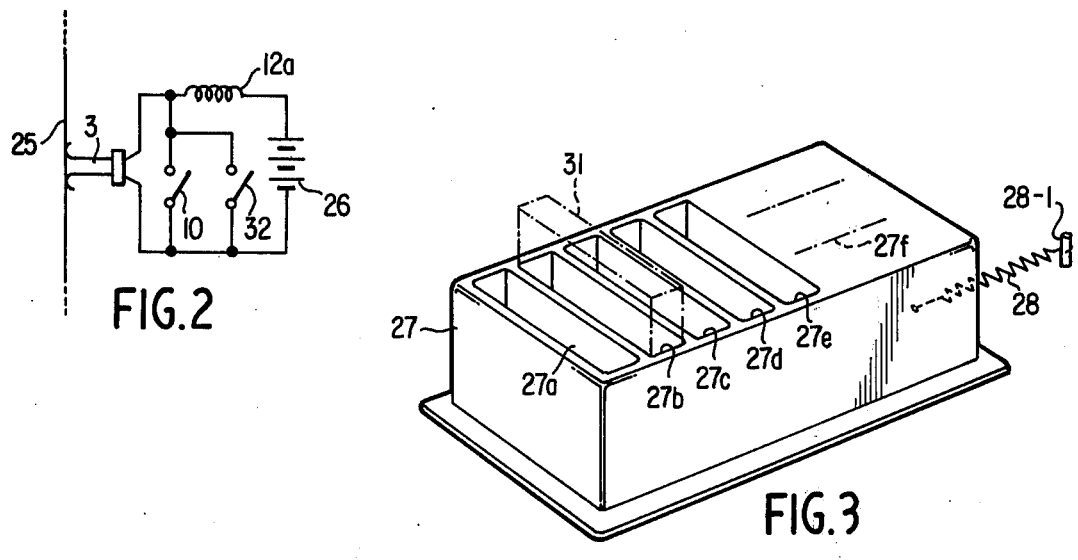
FIG.2
FIG.3
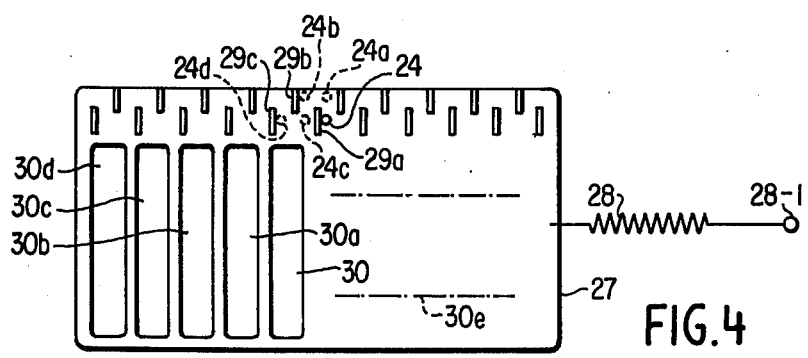
FIG.4

APPARATUS FOR TURNING ROTOR FOR EACH DESIRABLE ANGLE BY DRIVING FORCE OF CAPSTAN DRIVE SYSTEM

BACKGROUND OF THE INVENTION

The present invention relates to an apparatus for turning, for each desirable angle, a rotor which is driven by a capstan or a shaft of the driving system.

It is quite effective to use a capstan driving system as a power source for the automatic operation of a magnetic recording and reproducing apparatus, especially such an apparatus for a cartridge or a cassette. The speed of a capstan can be easily reduced, to provide a power output, and a capstan motor which has strong and stable power can be used as the driving source, and accordingly, it is used as an effective power source. However, the reproduced tone quality is deteriorated by an adduct for inhibiting the rotation of the capstan in a reproducing operation. Accordingly, it is necessary to completely separate the apparatus for said power from the capstan drive system in the reproducing operation.

SUMMARY OF THE INVENTION

It is an object of the present invention to provide an apparatus for turning a rotor, for each desirable angle, without generating mechanical sound in the operation.

In is another object of the present invention to provide an apparatus for turning a rotor with little power, for commanding an initiation of the output of power and to automatically stop the rotor, and to vary the rotary angle of the rotor as desired, and to give high driving torque.

The foregoing and the other objects of the present invention have been attained by providing an apparatus for turning a rotor for each desirable angle by a capstan drive system which comprises an eccentric free travelling ring disposed at a free edge of a turnable lever so as to contact and to detouch a rotary shaft of the capstan power system, a small gear connected to the free travelling ring, and a gear interlocked to the small gear for reducing the rotation of the small gear and being pivoted to a pivot bearing of the turnable lever. A spring for pushing the free travelling ring of the turnable lever toward the rotary shaft of the capstan drive system is provided, as is an electromagnetic device for interlocking the free edge of the turnable lever around a minimum deviation point of the free travelling ring, and a mechanism for releasing the interlock of the turnable lever by applying power to the electromagnetic device. Also, there is provided an electric switch which is actuated only when the gear is substantially turned for 1/n ($n$ is an integer of 1, 2, .....), and a mechanism for maintaining an inactuation of interlock of the turnable lever by the electromagnetic device when this switch is inactuated.

BRIEF DESCRIPTION OF THE DRAWINGS

Various other objects, features and attendant advantages of the present invention will be more fully appreciated as the same becomes better understood from the following detailed decription when considered in conjunction with the accompanying drawings, wherein like reference characters are used to designate like or corresponding parts and in which:

FIG. 1 is a schematic view of a preferred embodiment of an apparatus constructed according to the present invention;

FIG. 2 is a control circuit diagram of the apparatus;

FIG. 3 is a schematic view of a box for a cartridge, and

FIG. 4 is a plan view of the box for the cartridge.

DETAILED DESCRIPTION OF THE PREFERRED EMBODIMENTS

Referring now to the drawings, and more particularly to FIG. 1, wherein there is shown one embodiment of an automatic continuous player equipped with a cartridge having an endless magnetic tape, the cartridge 1 is inserted in the direction indicated by the arrow G into a box 2 fastened with a plurality of bolts and nuts 2-1, 2-2, 2-3, ..... onto a deck, not shown, to form a chamber for receiving the cartridge. A pinch roller 5 disposed in the cartridge 1 pushes the capstan 4 on the deck. Pressure is provided in a conventional manner, for example, by pushing a roller 19 against the slant surface of a notch 1a formed in the side part of the cartridge. The roller 19 is disposed on one end of a lever 18 which is pivoted on the pivot bearing 18-1 disposed on the deck, and is pushed in the direction designated by the arrow F.

The references 20, 21 designate guide rollers disposed between the deck and the box 2 and adapted to guide the cartridge 1 during its insertion and removal. A fly-wheel, not shown, is mounted to the capstan 4 and is driven in a conventional manner as through a belt by a motor, also not shown. An electric contact 3 for detecting an end-mark of a magnetic tape is disposed at the front edge of the cartridge 1 so as to form a short-circuit by an aluminum conductor of the end-mark.

A magnetic head and a magnetic track switching mechanism (not shown) are provided.

A lever 6 is rotatably connected to a stud pivot bearing 6-1 on the upper surface of the box 2 and is pulled by a spring 33 in the direction indicated by the arrow E. A rotor, or gear, 9 is also rotatably fitted to the pivot bearing 6-1. Another gear 8 and an eccentric travelling ring 7, which are formed in one piece, are pivoted to the pivot bearing 6-2. The rotor, or gear 9 is interlocked to the gear 8 at a high reduction gear ratio, and if necessary, another pair of reduction gears are connected.

The free edge of the lever 6 is interlocked to an interlocking lever 11, which is pivoted to a bearing 11-1 mounted on the box 2. A working element 12-1 of a small electromagnetic plunger 12 mounted on the box 2 is connected to the interlocking lever 11. When a certain pulse is applied to the electromagnetic plunger 12, the interlocking lever 11 is turned in a counter-clockwise direction by the working element 12-1 to release the interlocking thereof with the lever 6. Accordingly, the peripheral rubber of the travelling ring 7 is turned under pushing of the capstan 4 projected from the hole 2c formed in the box 2.

Another lever 13 is pivoted at one end to a stud pivot bearing 13-1 on the upper surface of the box 2 which is pushed by a spring in the direction indicated by the arrow C. A further lever 14 is pivoted to a stud pivot bearing 14-1 and carries a stud pin 14-2 which is slidably fitted within an elongated guide hole 13-3 in the opposite end of the lever 13 of its pivot. A lever 15 is pivoted on the lower surface of the lever 14 at the free edge of the lever 14 so as to be rotatable to a desirable angle in both right and left directions by a pivot bearing 15-1. A pair of contact members 15a and 15b are fixed respectively at opposite ends of the lever 15. When the gear 9 is turned in the direction indicated by the arrow D, a stud contact pin 9b on the rear surface of the gear 9 is turned in the direction of the arrow D to contact the lower surface, as illustrated, of a bent part 13-2 of the lever 13 under pressure. Accordingly, the lever 13 is turned in a counter-clockwise direction, and the lever 14 is turned in the clockwise direction through the elongated guide hole 13-3 and the stud pin 14-2. Thus, the contact members 15a and 15b push upon the front surface of the cartridge 1 in the opposite direction of the arrow G to displace it from the box. The cartridge 1 is thus pushed up by a half turn of the gear 9.

As the time the cartridge is pushed up, it is transversely moved to effect an exchange with another cartridge by the mechanism described below, referring to FIGS. 3 and 4.

When the gear 9 is turned through a half turn, the contact members 15a and 15b are moved, or drop down, whereby the exchanged cartridge drops into the chamber formed by the deck and the box 2. In the operation of displacing the cartridge 1 by turning of the lever 14 in the clockwise direction, the lever 14 slides the upper surface of the box 2. The lever 15 and the contact members 15a and 15b move along the rear surface of the box 2 to remove the cartridge 1. Accordingly, a long hole, not shown, is formed on the box 2 to permit travel of the pivot bearing 15-1.

A bent part 23a of a plate spring 23 whose end 23-1 is fixed on the upper surface of the box 2 is pressed around the maximum deviated point by turning the lever 13. Accordingly, a guide pin 24 mounted at the free end of the spring 23 travels both to the right and left for each reciprocating cycle. The mechanism of course is designed to accomplish the exchanging of a cartridge, and the operation thereof will be further illustrated below in referring to FIGS. 3 and 4.

A crank lever 16 is disposed between a pivot bearing 16-1 on the gear 9 and the stud pivot bearing 18-2 on the lever 18. The bearing 18-2 is freely fitted within an elongated guide hole 17 formed in the one end of the lever. When the gear 9 is turned a half turn in the direction of the arrow D, the lever 18 is turned counter-clockwise through the crank lever 16, against the spring bias in the direction of the arrow F, whereby the roller 19 is detached from the notch 1a. At this time, the cartridge 1 is pushed out by the contact members 15a and 15b. The exchanged cartridge falls downward to be received in the next half turn of the gear 9, and then the lever 18 is returned through the crank lever 16. The notch of the exchanged cartridge is contacted with the roller 19 to start the reproduction. The length of the guide long hole 17 and the relative position of the pivot bearing 18-2 are provided so as to smoothly perform the operation in a desirable order.

A cam 9a is formed on the surface of the gear 9 so as to contact with the working element 10-1 of a microswitch fixed to the body. Accordingly, the cam is contacted with the working element 10-1 for each turn of the gear 9 to turn off the microswitch 10.

FIG. 2 shows the control circuit having the microswitch 10. When the reproduction of a magnetic tape 25 is completed and the end mark detecting contact 3 forms a short circuit by the conductive part, a pulse is applied from a power source 26 to an excitation coil 12a, being the excitation coil of the electromagnetic plunger 12 of FIG. 1. The micro-switch 10 is connected in parallel to the end mark detecting contact 3. When the pulse is applied to the electromagnetic plunger 12, the interlock of the lever 6 by the interlock lever 11 is released, whereby the free travelling ring 7 is turned under pushing of the capstan 4 in the direction of the narrow B. Incidentally, the capstan 4 is turned in the direction of the arrow A.

As the gear 9 is turned in the direction of the arrow line D, the cam 9a is separated from the working element 10-1. Accordingly, the micro-switch 10 of FIG. 2 is closed, whereby current is passed through the excitation coil 12a during one turn of the gear 9, and the interlock of the lever 6 by the interlock lever 11 is kept in a position of inactuation. The turn by pushing the lever 13 with the contact pin 9b and the turn of the lever 18 through the crank lever 16 are caused against the force of strong springs so that the load is relatively high. However, the lever 6 receives the force turning in the clockwise direction, depending upon the load, by the reaction to the gear 8, whereby the free travelling ring 7 is pushed by the capstan 4 to cause accurate power transmission without slip. The reduction gear ratio of the gears 8 and 9 can be as high as desirable, whereby the load can be operated with large force. Accordingly, the operation can be accurate and smooth, without generation of mechanical noise. Thus, it is possible to provide an optimum drive mechanism for an acoustic apparatus.

When the gear 9 is turned about a half turn, the gear 9 receives the force for driving in the opposite direction of the arrow D by the spring force of the spring connected to the lever 13 in the direction of arrow C and the spring force of the spring connected to the lever 18 in the direction of the narrow F. Accordingly, rotary torque is applied counter-clockwise through the gear 8 to the lever 6, whereby the free travelling ring 7 is separated from the capstan 4 to cause racing. Thus, all operations are accelerated to cause disadvantageously an impulse sound.

In order to overcome such disadvantage, the spring 22 is held between the bearing 16-1 and the bearing 22-1 of the body. During the first half-turn of the gear 9, the force of the spring 22 is against the force of the spring for the lever 18 in the direction of the arrow F. During the next haft-turn of the gear 9, the rotary torque of the lever 6 in the counter-clockwise direction is eliminated to leave the force for pushing the free travelling ring 7 to the capstan 4 by the spring 33, so as to prevent racing.

When the bearing 6-1 of the lever 6 is moved to the extended line of the lever 6, to give the position shown by the dotted line 6a, instead of using the spring 22, the force given through the crank lever 16 is always in the direction for pushing the free travelling ring 7 to the capstan 4, whereby the abovementioned disadvantage is prevented. In such case, the bearing of the gear 9 should be disposed on the lever 6 at the point of the reference 6-1.

When the reciprocal movement of the crank lever 16 contacted with a rotary cam is given by using the rotary cam which is coaxial to the gear 9 and is synchronously turned without a crank mechanism, to move the roller 19 in and out of the notch 1a, it is unnecessary to consider the above-mentioned problem. In such case, the reaction of the crank lever 16 is given to the bearing 6-1, whereby the rotary torque to the lever 6 is not generated.

During one turn of the gear 9, the free travelling ring 7 turns several times, whereby the lever 6 is reciprocated several times. However, the interlock lever 11 is behind the lever 6 under the actuation of the electromagnetic plunger 12, whereby the interlock lever is not interlocked. Thus, when the gear is substantially turned for one turn, the cam part 9a is again contacted with the working element 10-1 to turn off the micro-switch 10, whereby the interlock lever 11 is returned by the force of the spring in the direction of the arrow H. Accordingly, the lever 6 is interlocked. When the free travelling ring 7 is turned through a small angle, it reaches beyond the minimum deviation point, whereby the free travelling ring 7 is automatically detached from the capstan 4, to prevent power transmission.

In this embodiment, the power transmission is given to the free travelling ring 7 by the capstan 4. However, it is possible to provide the power transmission in a similar manner through another rotary shaft driven by a capstan motor.

In another embodiment of an automatic player according to this invention, when the gear 9 is turned to stop for each 90° in each pulse input to the electromagnetic plunger 12, the same object can be attained by providing four equiangularly disposed cams 9a.

Referring now to FIGS. 3 and 4, the embodiment will be described. A plurality of aperatures 27a, 27b, ..... are formed on the upper surface of a container for the cartridges. Five apertures only are shown, and the other dotted line 27f designates other apertures. The container 27 is slidably supported on guide. grooves, not shown, to move to the right and left, as shown. The mechanism of FIG. 1 is provided at the lower part of the container 27. A spring 28 is held between a support 28-1 on the body and the container 27. The cartridge 31, shown by the dotted line, is inserted into the chamber 27b. In the other chambers, cartridge are respectively inserted from the upper apertures.

FIG. 4 is a view of the rear surface of the container of FIG. 3. The projections 29a, 29b, 29c, ..... are alternatively formed and the edge of the contact pin 24 of FIG, 1. is contacted with the projection 29a to prevent sliding of the container 27 against the force of the spring 28 to the right. In such case, the cartridge falls down through the apertures 30 in a bottom of the chamber for the cartridge to fit the cartridge to the chamber formed by the box 2 and the deck of FIG. 1, whereby reproduction is started. The apertures 30a, 30b, ..... are formed on the bottom corresponding to the chamber 27d, 27c, 27b, ..... . The dotted line 30e indicates that other apertures, not shown, may be present as desired.

After completing the reproduction, the excitation coil is temporarily actuated, as illustrated in FIG. 2, whereby the gear 9 of FIG. 1 is automatically stopped after one turn. Accordingly, the roller 19 is detached from the notch 1a and the cartridge 1 is pushed up through the levers 13 and 14 and the contacts 15a and 15b. Thus, the cartridge is pushed up through the aperture 30 to the chamber 27e of FIG. 3. When the cartridge is completely inserted into the chamber 27e, the part 23a of the plate spring 23 is pushed by the free edge of the lever 13 to move one cycle. The contact pin 24 is then moved to the position of the dotted line 24a of FIG. 4. At this time, the container 27 is slided to the right by the force of the spring 28 and the contact pin 24 is moved to the part 24b to contact with the projection 29b. Then, the contact pin 24 moves to the position 24c and accordingly, the container 27 is further slided to move the contact pin 24 to the part 24d to contact with the projection 29c so as to stop the slide of the container 27. The aperture 30a of the bottom of the aperture 27d then corresponds to the upper surface of the chamber formed by the box 2 and the deck. Accordingly, the next cartridge in the chamber 27d is guided by the contact members 15a and 15b to fall down into the box 2 to be in position for reproduction.

Roller 19 of FIG. 1 is then contacted with the slant surface of the notch 1a by turning from the upper part, whereby the pressure is given between the capstan 4 and the pinch roller 5 to begin the reproduction. The operation of the roller 19 turning from the upper part through the turn of the lever 18 to the slant surface of the notch 1a imparts the following effects in the embodiment of the invention. The position of the notch 1a is slightly deviated depending upon the commerical cartridge. When the cartridge falls down, the magnetic head and the end mark detaching contact 3 are contacted through the magnetic tape to an elastic part on the rear surface. Accordingly, the cartridge is stopped at the position slightly higher than the position for reproduction.

In the illustrated embodiment, the roller 19 rotates from the upper part to the slant surface of the notch 1a, whereby the cartridge raised is pressed down from the upper part. Accordingly, the cartridge can be moved and fitted at the position for reproduction in a stable and accurate condition. As is clear from the description, the cartridge is automatically exchanged at each time upon completing the reproduction of the cartridge, and the reproduction is sequentially conducted by the automatic playing apparatus. When the cartridge is fitted to the box 2, the microswitch 32 of FIG. 1 is turned off by contacting the actuator with the front peripheral edge of the cartridge.

The micro-switch 32 is shown by the same reference numeral in FIG. 2, and the micro-switch has the following effect. For example, when a cartridge is not inserted into the chamber 27b which is one of the chambers 27a, 27b, ..... of the container 27, the gear 9 is turned for 1 turn and is automatically stopped by facing the chamber 27b to the chamber formed by the box 2 under moving of the container to the right after completing the reproduction of the cartridge in the chamber 27c. However, a cartridge for being inserted into the box 2 is not present and accordingly the reproduction is not conducted and all mechanism are disadvantageously stopped.

However, when the micro-switch 32 is provided, the operation is modified as follows. When a cartridge for inserting into the box 2 is not present, the micro-switch 32 is kept in an "ON" state. Accordingly, the excitation coil 12a is kept in current condition, whereby the interlocking lever 11 is kept in the position turned in the counter-clockwise direction. Thus, the lever 6 is not interlocked and the travelling ring 7 is sequentially turned without departing from the capstan 4 and the gear 9 is further turned for one more turn. Accordingly, the cartridge inserted in the chamber 27a is reproduced. As is clear from the description, a chamber which has no inserted cartridge in the next chamber.

The above-mentioned embodiments are applicants of the invention to cartridge type automatic playing apparatus. Thus, it is possible to apply the invention to other type automatic playing apparatus, such as cassette type apparatus. In the latter case, the cassette is pressed on the deck by the operation of the lever 16, whereby the reel shaft and the capstan are fitted in the cassette to form the automatic playing apparatus. In accordance with the apparatus of the present invention, the above-mentioned objects of the invention have been attained to provide remarkable advantages.

Obviously, many modifications and variations of this invention are possible in light of these teachings. It is therefore to be understood that within the scope of the appended claims, the invention may be practiced otherwise than as specifically described herein.

What is claimed as new and intended to be secured by Letters Patent is:

1. An apparatus for turning a rotary element, of a tape cartridge insertion and removal system, for each desirable angle by a capstan drive system which comprises:
   a lever turnable about a pivot bearing at one end thereof, the other end being free;
   an eccentric free travelling ring carried by said turnable lever at a point revoved from said pivot end thereof so as to be contactable and discontactable from a rotary shaft of said capstan drive system;
   a small gear connected to said free travelling ring;
   a rotary element drivingly engaged with said small gear for reducing the rotation thereof and being pivotally mounted on said pivot bearing of said turnable lever;
   lever means operatively associated with said rotary element at one end thereof and operatively engageable with said tape cartridge at the other end for permitting and forcefully ejecting said tape cartridge from a cartridge housing mounted on a tape deck, or for preventing the ejection of said cartridge from said housing, depending upon the rotary position of said rotary element;
   means for biasing said free travelling ring toward said rotary shaft of said capstan drive system;
   electromagnetic control means for interlocking the free end of said turnable lever so as to prevent contact of said free travelling ring with said rotary shaft of said capstan drive system; and
   means for actuating said electromagnetic control means for releasing the interlock of said free end of said turnable lever so as to permit contact of said free travelling ring with said rotary shaft of said capstan drive system.

2. The apparatus of claim 1, wherein said means for actuating said electromagnetic control means comprises an electric switch and a member on said rotary element contactable therewith when said rotary element is turned through a predetermined rotation for operating said switch.

3. The apparatus of claim 1, further comprising:
   a stud disposed upon said rotary element; and
   said lever means includes a first lever pivotally mounted at one end thereof upon said cartridge housing and operatively engageable at the other end thereof with said stud of said rotary element when said rotary element rotates through a predetermined angular displacement, and a second lever pivotably mounted upon said cartridge housing at one end thereof, operatively engaged with said first lever at the central portion thereof, and operatively engageable at the other end thereof with said tape cartridge in response to the movement of said first lever as a result of the engagement of said first lever with said stud of said rotary element, so as to eject said cartridge from said cartridge housing.

4. The apparatus of claim 1, further comprising:
   means defining a notch within a sidewall of said tape cartridge; and
   said lever means includes a third lever pivotally mounted upon said rotary element at one end thereof, and a fourth lever pivotably mounted upon said tape deck at the central portion thereof while one end thereof is operatively engaged with the other end of said third lever, and the other end thereof is operatively engageable with said notch of said cartridge.

* * * * *